G. E. MOREHOUSE.
LAWN MOWER.
APPLICATION FILED JUNE 13, 1921.
1,427,617.
Patented Aug. 29, 1922.
2 SHEETS—SHEET 1.
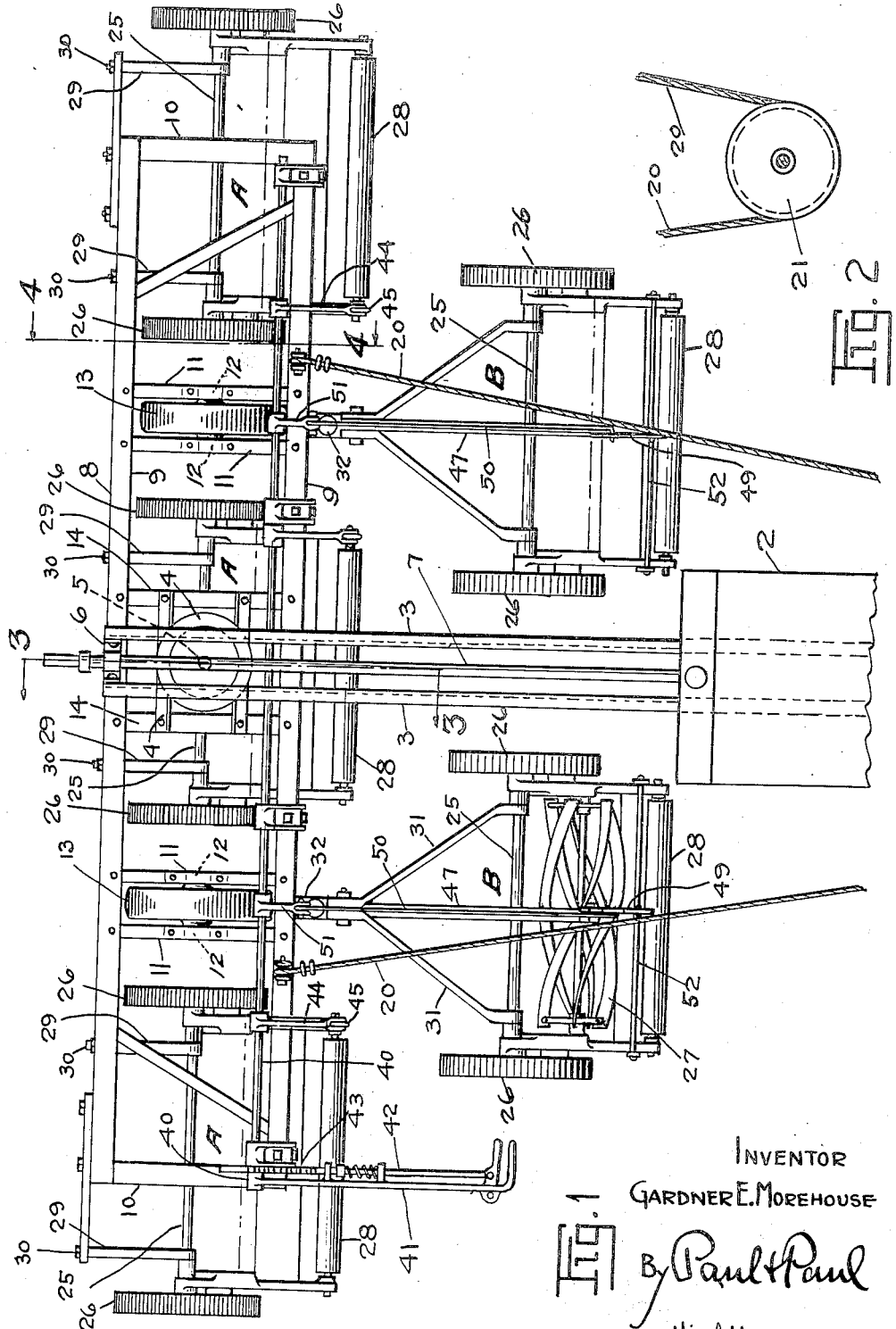
INVENTOR
GARDNER E. MOREHOUSE
By Paul+Paul
His Attorneys

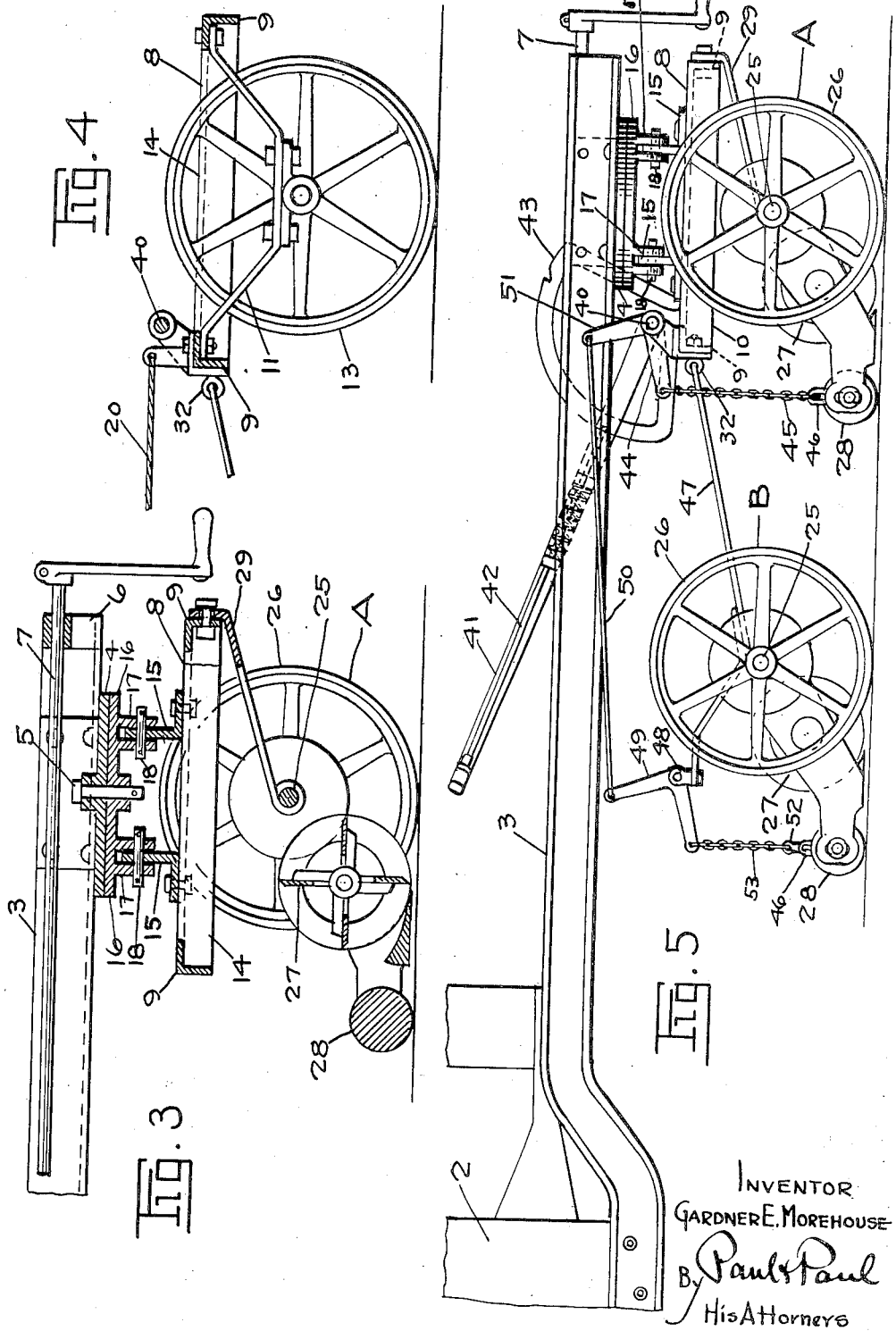

UNITED STATES PATENT OFFICE.

GARDNER E. MOREHOUSE, OF MOLINE, ILLINOIS, ASSIGNOR TO TORO MANUFACTURING COMPANY, OF MINNEAPOLIS, MINNESOTA, A CORPORATION OF MINNESOTA.

LAWN MOWER.

1,427,617.   Specification of Letters Patent.   Patented Aug. 29, 1922.

Application filed June 13, 1921. Serial No. 477,308.

*To all whom it may concern:*

Be it known that I, GARDNER E. MOREHOUSE, a citizen of the United States, resident of Moline, in the county of Rock Island and State of Illinois, have invented certain new and useful Improvements in Lawn Mowers, of which the following is a specification.

This invention relates to improvements in lawn mowers and particularly to improvements in mowers designed to be operated by a tractor or power driver, as distinguished from lawn mowers operated by horse-power or moved by hand, and adapted particularly for use in mowing large lawns or golf courses.

The invention consists generally in the constructions and combinations hereinafter described and particularly pointed out in the claims.

In the accompanying drawings forming part of this specification,

Figure 1 is a plan view of a lawn mower embodying my invention, a portion only of the main tractor frame being illustrated.

Figure 2 is a detail showing the drum to which the steering cables are connected and by which the draft frame is turned for the purpose of steering the machine.

Figure 3 is a longitudinal section on line 3—3 of Figure 1, looking in the direction of the arrow.

Figure 4 is a section on line 4—4 of Figure 1, looking in the direction of the arrow.

Figure 5 is a partial side elevation showing the mower traction wheels and the means for raising and lowering the mowers.

In the drawings, 2 represents the forward portion of the main or tractor frame, the rear end of which is supported by a pair of traction or driving wheels, and is provided with a suitable steam or gas engine or motor by means of which said traction wheels are driven for the purpose of moving the machine.

I have not thought it necessary to illustrate in this application the details of the rear part of the tractor frame, and its motor and traction wheels, as such devices form no part of my present invention.

For convenience of description I designate the frame 2, the parts supporting the rear portion thereof and the mechanism for operating the same, as the "tractor" or "driver," although, strictly speaking, the means for supporting the forward end of the frame 2, particularly described herein, may be considered as a part of the said tractor or driver.

As here shown, the tractor frame 2 is provided with a forwardly extending reach 3, preferably formed of a pair of channel irons, rigidly connected to the frame 2 and supporting near their forward ends the upper member 4 of a fifth wheel, provided with a turning or king-bolt 5. The forward ends of the channel irons, forming the reach 3, are connected by a block 6, which may form a bearing for a suitable engine starting crankshaft 7.

Arranged below the reach 3, and extending laterally in both directions therefrom, is a mower draft frame 8. This frame may be of any suitable construction, but I prefer to form it of the parallel front and rear angle-iron bars 9, 9, and end-bars 10, 10. I also prefer to provide, connecting the bars 9, 9, pairs of depending struts 11, 11, to which are secured bearings 12 for the draft frame supporting wheels 13, 13. These are preferably idle wheels, and they are preferably arranged one at each side of the reach 3, and are usually loaded about midway between the reach 3, and the end of the frame 8. As the struts 11 are rigidly secured to the draft frame 8, and as the journal blocks 12 are rigidly secured to said struts, the wheels do not have any pivotal or side swinging motion, but only a rotative motion upon their own axes. The other plate or member of the fifth wheel, indicated by the reference numeral 16, is clearly shown in Figure 3 of the drawings. This fifth wheel member is centered upon the king-bolt 5 so as to be capable of oscillating about said king-bolt as a center, and it may be connected to the frame 8 in any suitable manner, but, preferably, by means that permits the ends of the frames to rise and fall, or in other words permits the frame 8 to oscillate about a longitudinal, centrally arranged, pivot, thereby permitting either end of said frame to move up or down so as to accommodate the machine to uneven surfaces of the ground.

As here shown the plate 16 is provided with the two pairs of downwardly extending lugs 17. Cross-bars 14 extend from one bar 9 to the other, and the said bars support the transversely extending upright bars 15. As here shown the bars 15 are in the form of angle irons, their horizontal flanges supported upon the bars 14, that have their ends connected to the bars 9 as indicated in Figures 1 and 3 of the drawings. Pins 18 extend through the lugs 17 and through holes in the upright plates 15. These pins, therefore, form pivots about which the draft frame 8 may oscillate or rock, so as to permit the structure to adapt itself to inequalities in the surface of the ground upon which the device is used.

Connected to the frame 8 at opposite sides of the fifth wheel are suitable cables 20 which extend back to a drum 21, suitably supported upon the frame 2 in position to be within convenient reach of an operator, who will usually be provided with a suitable seat carried by the frame 2.

The mechanism thus described forms a complete support for the forward portion of the tractor or driver frame, and as the frame 8 may be oscillated about its vertical or fifth wheel center by the cable arrangement shown, it is obvious that the device may be steered by an operator riding upon the frame 2.

It will be seen also that the entire weight of the forward portion of the tractor or driver, as well as the weight of the draft frame 8, is carried by the supporting wheels 13.

I connect to the draft frame 8, in such manner as to permit the same to "float", or travel without carrying any part of the weight of the tractor or driver, a series of lawn mower units of suitable construction, the mechanism of said mowers forming no part of my present invention, and I preferably arrange these mowers in two transversely extending lines, the rear mowers being preferably located so as to cover the spaces between the forward mowers.

As here shown I have employed five mower units three located in front and two in the rear, behind the spaces between the front mowers. It is obvious that this arrangement might be reversed and two mower units arranged in front, and three units arranged behind. It is further obvious that a greater or less number of mower units might be employed without departing from my invention.

The mower units that I employ are preferably all alike, but the draft devices for connecting these mower units to the draft frame 8 differ slightly, and for convenience herein I designate each front mower unit by the reference letter A, and each rear mower unit by the reference letter B.

Each of the mower units is provided with the usual axle 25, traction wheels 26, knife cylinder 27, and supporting roller 28.

For connecting the units A to the draft frame I provide for each mower unit a pair of inclined connecting rods 29, having their rear ends connected to the axles 25 of the mower units and with their forward ends pivotally connected by suitable pivot pins 30 to the forward bar 9 of the draft frame 8. For connecting the rear mower units to the draft frame I preferably provide the connecting rods 31 having their rear ends secured to the axle 25 of said rear units, with their forward ends preferably connected to an eye-bolt 32 secured to the rear bar 9 of the draft frame 8.

With this arrangement none of the lawn mowers support any of the weight of the tractor or draft frame, but each mower is freely connected to the draft frame, and is held to the surface of the ground merely by its own weight, which may be regulated to suit the character of the work to be performed. If preferred, means may be provided with each mower unit for adding weight thereto for the purpose of securing greater traction, and consequently greater power in driving the knives or cutting cylinders.

It will also be noted that the draft frame is capable of rocking about the longitudinal center furnished by the pins 18 thereby permitting the ends of the frame to rise and fall to accommodate the machine to uneven surfaces.

It will also be observed that the mower units are capable of a rocking motion, transverse to the line of travel of the machine, to permit each unit to accommodate itself to uneven surfaces, and that the rear units, being connected to the draft frame at single points located in front of the center of each unit, are capable of swinging as the draft frame is turned for the purpose of changing the course of the machine.

I also prefer to provide means for simultaneously raising and lowering all of the mower units so as to clear them from the surface of the ground and render them inoperative while the machine is being moved from one place to another.

As here shown I provide a rock shaft 40 mounted in bearings upon the draft frame 8. This shaft is provided with an operating lever 41 and with a sliding latch 42 arranged to engage notches in a fixed quadrant plate 43. The rock shaft 40 is preferably provided with an arm 44 for each of the front lawn mower units, and a chain or cable 45 extends from the end of each arm and is connected to a lug 46 of the mower frame (see Figure 5).

For raising the cutting cylinders of the rear mower units, I preferably provide a bar 47 that is arranged between the connecting bars 31, and forms the connection for said bars with the eye-bolt 32. This bar extends over the axle 25 of said rear mower unit, and has secured to it a standard or upright 48. A bell crank lever 49 is pivoted upon this standard, and the upper arm of the bell crank is connected by a cord or wire 50 with an arm 51, upon the rock shaft 40.

I preferably provide each of said mower units with a rod 52, extending across from one side of the frame to the other above the roll 28 and provide a connection 53 between said rod and one arm of the bell crank 49 (see Figure 5). By this means the operator can at any time by rocking the shaft 40 raise all of the cutting cylinders or knives from the ground and can hold them in an elevated position, so that the machine may be moved from place to place, with the cutting cylinders in this elevated or inoperative position.

I do not limit myself to the details of the construction herein shown and described, as the same may be varied in many particulars without departing from my invention.

I claim as my invention:

1. In a machine of the class described, the combination, with a main or traction frame, of a forwardly located and laterally extending draft frame, having a fifth wheel connection with said main frame, a pair of supporting wheels for said draft frame, one located at either side of the fifth wheel connection, whereby the weight of the draft frame and the forward part of the main frame is carried by said supporting wheels, and a series of lawn mower units independently connected with said draft frame, and arranged to be drawn thereby but without sustaining any of the weight of said draft frame and main frame.

2. In a machine of the class described, the combination, with a main or traction frame, of a forwardly located and laterally extending draft frame, having a fifth wheel connection with said main frame and capable of oscillating on a longitudinally extending pivot, a pair of supporting wheels for said draft frame, one located at either side of the fifth wheel connection, whereby the weight of the draft frame and the forward part of the main frame is carried by said supporting wheels, means for oscillating said draft frame from the said main frame on its fifth wheel center, and a series of lawn mower units independently connected with said draft frame, and arranged to be drawn thereby without sustaining any of the weight of said draft frame and main frame.

3. In a machine of the class described, the combination, with a main or traction frame, of a forwardly located and laterally extending draft frame, having a fifth wheel connection with said main frame and capable of oscillating on a longitudinally extending pivot, a pair of supporting wheels for said draft frame, one located at either side of the fifth wheel connection, whereby the weight of the draft frame is carried by said supporting wheels, means for oscillating said draft frame from the said main frame on its fifth wheel center, and means for connecting a series of independent mower units to said draft frame, whereby said units are drawn by said frame, while none of the weight of said frame is carried by said units.

In witness whereof, I have hereunto set my hand this 8th day of June 1921.

GARDNER E. MOREHOUSE.